US008051090B2

(12) United States Patent
Wu et al.

(10) Patent No.: US 8,051,090 B2
(45) Date of Patent: Nov. 1, 2011

(54) FILE MANAGEMENT METHOD OF A RING BUFFER AND RELATED FILE MANAGEMENT APPARATUS

(75) Inventors: Yuan-Tao Wu, Santa Clara, CA (US); I-Chien Yang, Hsinchu (TW); Yung-Hsiao Lai, Taipei County (TW); Chen Ma, San Jose, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 367 days.

(21) Appl. No.: 11/965,771

(22) Filed: Dec. 28, 2007

(65) Prior Publication Data

US 2009/0171886 A1 Jul. 2, 2009

(51) Int. Cl.
*G06F 17/30* (2006.01)
(52) U.S. Cl. .................................................. 707/758
(58) Field of Classification Search ................ 707/758
See application file for complete search history.

(56) References Cited

U.S. PATENT DOCUMENTS

| | | | | |
|---|---|---|---|---|
| 5,108,207 A * | 4/1992 | Isobe et al. | ............... | 400/70 |
| 5,282,275 A * | 1/1994 | Andre et al. | ............... | 711/220 |
| 5,371,551 A * | 12/1994 | Logan et al. | ............... | 348/571 |
| 5,526,128 A * | 6/1996 | Fujiki et al. | ............... | 358/444 |
| 5,920,842 A * | 7/1999 | Cooper et al. | ............... | 704/503 |
| 6,192,484 B1 * | 2/2001 | Asano | ............... | 714/6 |
| 6,233,389 B1 * | 5/2001 | Barton et al. | ............... | 386/46 |
| 6,363,470 B1 * | 3/2002 | Laurenti et al. | ............... | 711/220 |
| 6,438,630 B1 * | 8/2002 | DeMoney | ............... | 710/56 |
| 6,463,486 B1 * | 10/2002 | Parry et al. | ............... | 710/52 |
| 6,587,480 B1 * | 7/2003 | Higgins et al. | ............... | 370/522 |
| 7,068,921 B1 * | 6/2006 | Park | ............... | 386/125 |
| 7,095,945 B1 * | 8/2006 | Kovacevic | ............... | 386/12 |
| 7,260,312 B2 * | 8/2007 | Srinivasan et al. | ............... | 386/95 |
| 2002/0122656 A1 * | 9/2002 | Gates et al. | ............... | 386/46 |
| 2003/0001848 A1 * | 1/2003 | Doyle et al. | ............... | 345/501 |
| 2003/0067554 A1 * | 4/2003 | Klarfeld et al. | ............... | 348/461 |
| 2004/0086263 A1 * | 5/2004 | Arora | ............... | 386/69 |
| 2005/0273486 A1 * | 12/2005 | Keith | ............... | 709/200 |
| 2006/0106978 A1 * | 5/2006 | Moore | ............... | 711/110 |
| 2009/0007159 A1 * | 1/2009 | Rangarajan et al. | ............... | 719/328 |

FOREIGN PATENT DOCUMENTS

CN 1529887 A 9/2004

OTHER PUBLICATIONS

Webmaster World, Video Bigger than 4GB, Nov. 4, 2004 (retrieved Aug. 31, 2010).*

* cited by examiner

*Primary Examiner* — James Trujillo
*Assistant Examiner* — William Spieler
(74) *Attorney, Agent, or Firm* — Thomas, Kayden, Horstemeyer & Risley, LLP

(57) ABSTRACT

A file management method of a ring buffer includes translating actual positions of an actual file stored in the ring buffer into virtual positions of a virtual file according to a specific mapping manner, searching the actual positions in the actual file according to the virtual positions, and accessing data at the actual positions of the actual file stored in the ring buffer.

14 Claims, 7 Drawing Sheets

FILE MANAGEMENT METHOD OF A RING BUFFER AND RELATED FILE MANAGEMENT APPARATUS

BACKGROUND OF THE INVENTION

1. Field of the Invention

The present invention relates to a file management method of a ring buffer and related file management apparatus, and more particularly, to a file management method of a ring buffer and related file management apparatus for translating actual positions of an actual file stored in the ring buffer into virtual positions of a virtual file according to a specific mapping manner.

2. Description of the Prior Art

For live-media applications, such as digital TV broadcasting, saving live content into local storage and allowing users to view it later can bring great benefit compared with traditional TV viewing experiences. This is sometimes referred to as a time-shift or live-pause feature. Generally, vendors compress audio-video sources with high bit rate, especially for HD (high definition) contents. As a result, the size of the local storage required for storing such media streams must be large and the recorded file size is unpredictable and may be huge.

Furthermore, all common playback applications deal with constant files, i.e., the contents of the files should not be changed as time changes, especially for linear playback, which is not suitable for the time-shift application since the contents of the files is always changed.

SUMMARY OF THE INVENTION

It is one of the objectives of the claimed invention to provide a file management method of a ring buffer and related file management apparatus to solve the abovementioned problems.

According to an exemplary embodiment of the present invention, a file management method of a ring buffer is provided. The file management method includes translating actual positions of an actual file stored in the ring buffer into virtual positions of a virtual file according to a specific mapping manner, searching the actual positions in the actual file according to the virtual positions, and accessing data at the actual positions of the actual file stored in the ring buffer. The file management method is employed in a live media time-shift application.

According to another exemplary embodiment of the present invention, a file management apparatus of a ring buffer is provided. The file management apparatus includes a translation module, a searching module, and a data access module. The translation module is used for translating actual positions of an actual file stored in the ring buffer into virtual positions of a virtual file according to a specific mapping manner. The searching module is coupled to the translation module for searching the actual positions in the actual file stored in the ring buffer according to the virtual positions. The data access module is coupled to the ring buffer and the searching module for accessing data at the actual positions of the actual file stored in the ring buffer. The translation module includes an actual read pointer, an actual write pointer, a virtual read pointer, and a virtual write pointer. The file management apparatus is employed in a live media time-shift application.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
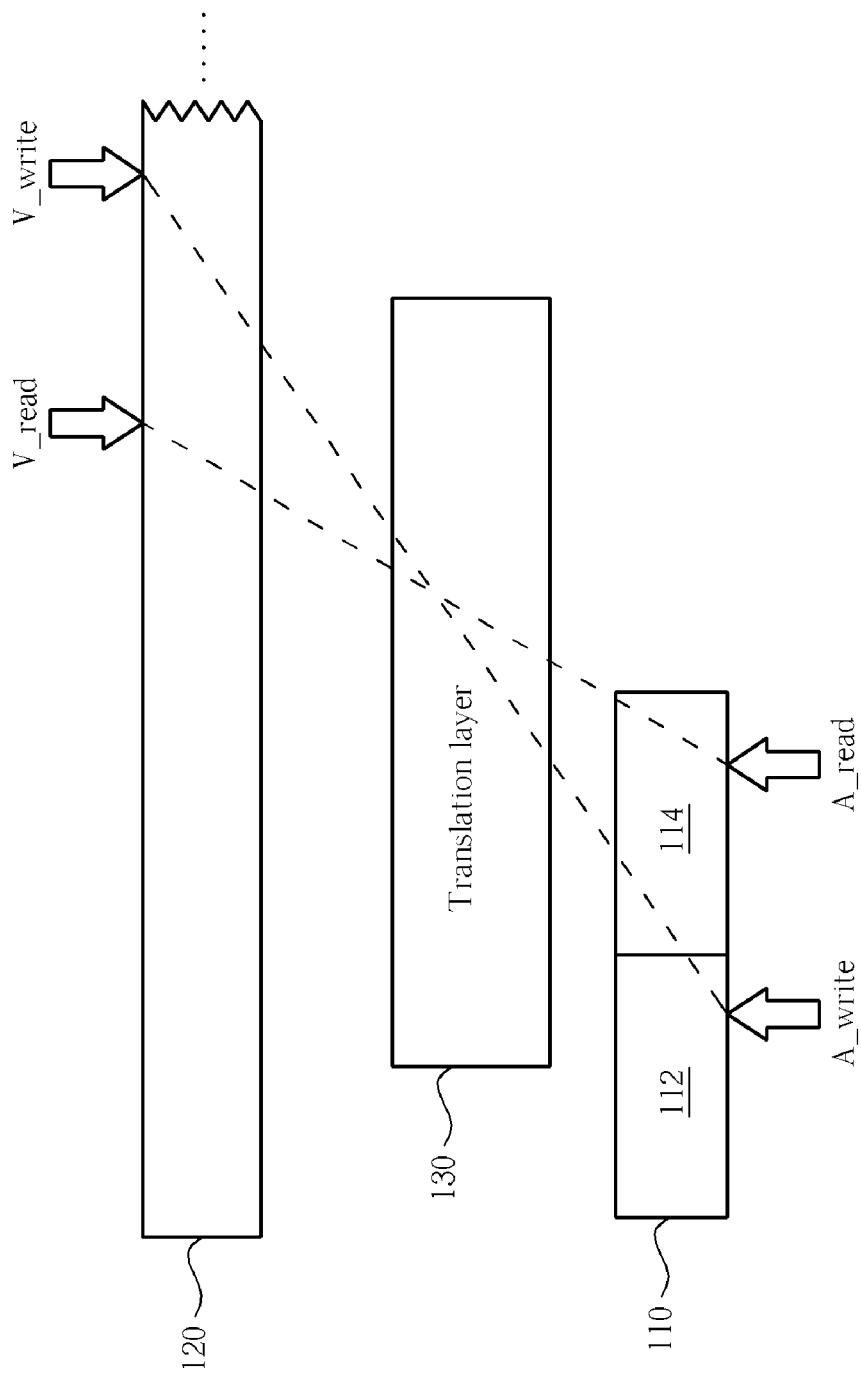
FIG. 1 is a diagram illustrating a mapping relationship between actual positions of an actual file stored in a ring buffer and virtual positions of a virtual file.

Please refer to FIG. 1. FIG. 1 is a diagram illustrating a mapping relationship between actual positions of an actual file stored in a ring buffer 110 and virtual positions of a virtual file 120. As shown in FIG. 1, the ring buffer is used for storing at least one actual file, for example, a first actual file 112 and a second actual file 114. Through a translation layer 130, actual positions of the actual files 112 and 114 stored in the ring buffer 110 can be translated into virtual positions of the virtual file 120 according to a specific mapping manner. In this embodiment, a virtual read position V_read of the virtual file 120 is mapped to an actual read position A_read of the actual file 114, and a virtual write position V_write of the virtual file 120 is mapped to an actual write position A_write of the actual file 112.

A size limit of the virtual file 120 is infinite, which means the file size of the virtual file can increase endlessly. So the virtual file is so-called infinite and linear. Users can only see the virtual read position V_read and the virtual write position V_write of the virtual file 120. In fact, however, a size limit of the ring buffer 110 is finite (for example, 10 GB). Through the translation layer 130, storages with limited sizes can be viewed as infinite to meet hardware requirements. Furthermore, the virtual file 120 is suitable for traditional recording and playback applications, which also meets software requirements. For example, when the users keep writing data into such a file (recording operation) with the virtual write position V_write, the file size of the virtual file keeps increasing while the file size of the actual file is unchanged. The needs to figure out the actual write position A_write, and then overwrite the old data automatically. Therefore, only the last data stored in the actual file are valid. In addition, the users can read any bytes within the virtual file (playback operation). However, only data reading within the range of the last data stored in the actual file can be successful.

Please note that, the abovementioned ring buffer 110 is used for storing a media stream, which includes data such as an audio-video stream transmitted from network or TV broadcasting signals, etc., but those skilled in the art should readily know that this is not a limitation of the present invention. The ring buffer 110 can be over-written unceasingly if contents of the media stream keep changing.

Figure 2:
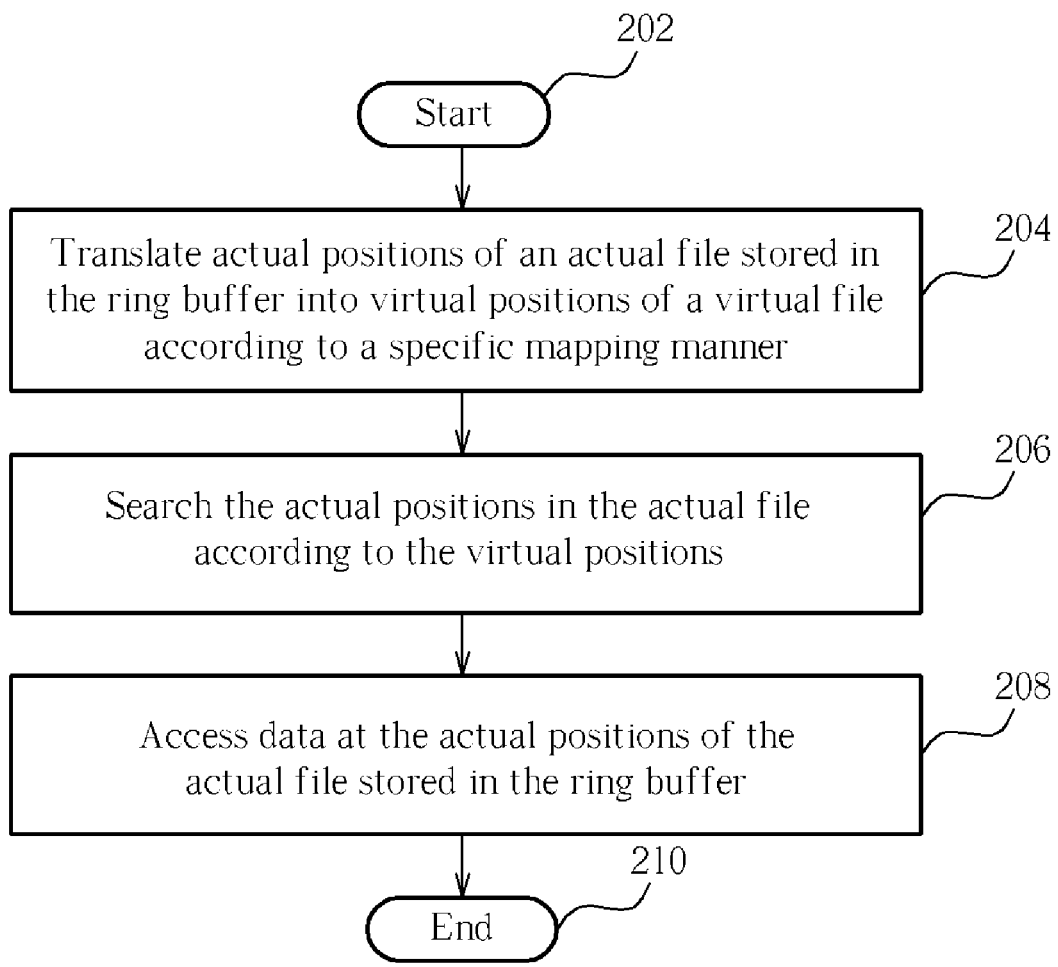
FIG. 2 is a flowchart illustrating a file management method of a ring buffer according to an exemplary embodiment of the present invention.

Please refer to FIG. 2. FIG. 2 is a flowchart illustrating a file management method of a ring buffer according to an exemplary embodiment of the present invention. Please note that the following steps are not limited to be performed according to the exact sequence shown in FIG. 2 if a roughly identical result can be obtained. The file management method includes the following steps:

Step 202: Start.

Step 204: Translate actual positions of an actual file stored in the ring buffer into virtual positions of a virtual file according to a specific mapping manner.

Step 206: Search the actual positions in the actual file according to the virtual positions.

Step 208: Access data at the actual positions of the actual file stored in the ring buffer.

Step 210: End.

Figure 3:
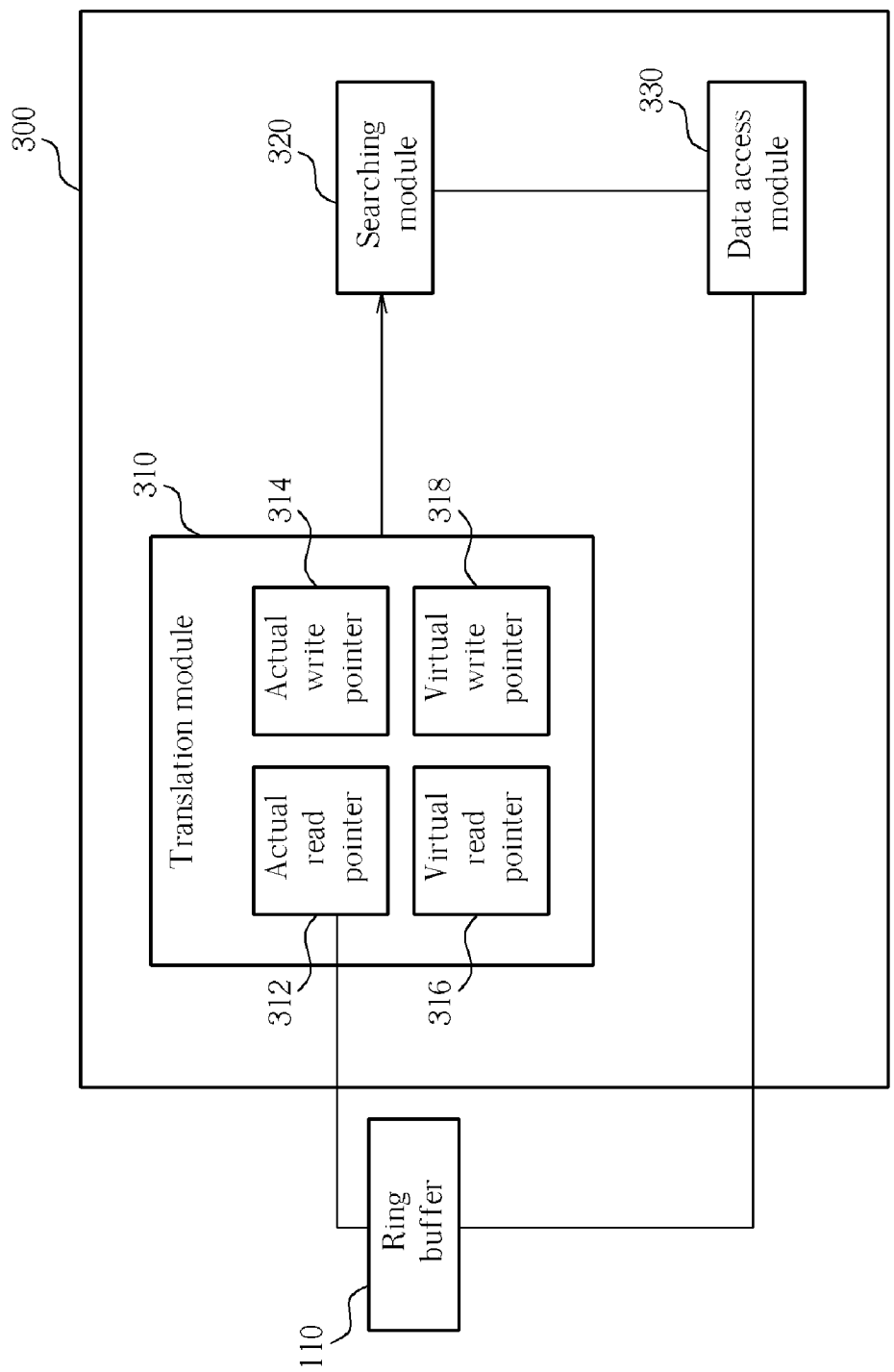
FIG. 3 is a block diagram of a file management apparatus according to an embodiment of the present invention.

Please refer to FIG. 3. FIG. 3 is a block diagram of a file management apparatus 300 of a ring buffer illustrated according to an embodiment of the present invention. The file management apparatus 300 includes, but is not limited to, a translation module 310, a searching module 320, and a data access module 330. The translation module 310 is used for translating actual positions of an actual file stored in the ring buffer 110 into virtual positions of a virtual file according to a specific mapping manner. The translation module 310 includes an actual read pointer 312, an actual write pointer 314, a virtual read pointer 316, and a virtual write pointer 318, wherein the actual read pointer 312 points to the actual read position A_read, the actual write pointer 314 points to the actual write position A_write, the virtual read pointer 316 points to the virtual read position V_read, and the virtual write pointer 318 points to the virtual write position V_write. The searching module 320 is coupled to the translation module 310 for searching the actual positions in the actual file stored in the ring buffer according to the virtual positions. The data access module 330 is coupled to the ring buffer 110 and the searching module 320 for accessing data at the actual positions of the actual file stored in the ring buffer 110.

Please refer to FIG. 3 together with FIG. 2 and FIG. 1. In the following description, how each element operates is described by collocating the steps shown in FIG. 2 and the elements shown in FIG. 3. In Step 204, actual positions of the actual file stored in the ring buffer 110 are translated into virtual positions of the virtual file by the translation module 310. That is, the actual write position A_write of the actual file 112 stored in the ring buffer 110 is translated into the virtual write position V_write of the virtual file 120, and the actual read position A_read of the actual file 114 stored in the ring buffer 110 is translated into the virtual read position V_read of the virtual file 120. If the virtual positions (i.e., the virtual write position V_write and the virtual read position V_read) are given, the actual positions (i.e., the actual write position A_write and the actual read position A_read) in the actual file are then searched by the searching module 320 according to the virtual positions (Step 206). Finally, data at the actual positions of the actual file stored in the ring buffer 110 are accessed by the data access module 330 (Step 208).

Please note that, in one exemplary embodiment, the file management method and the file management apparatus 300 are both employed in a live media time-shift application. Furthermore, the abovementioned ring buffer 110 can be a hard disk, but is not limited to this only and can be storage devices of other types.

Figure 4:
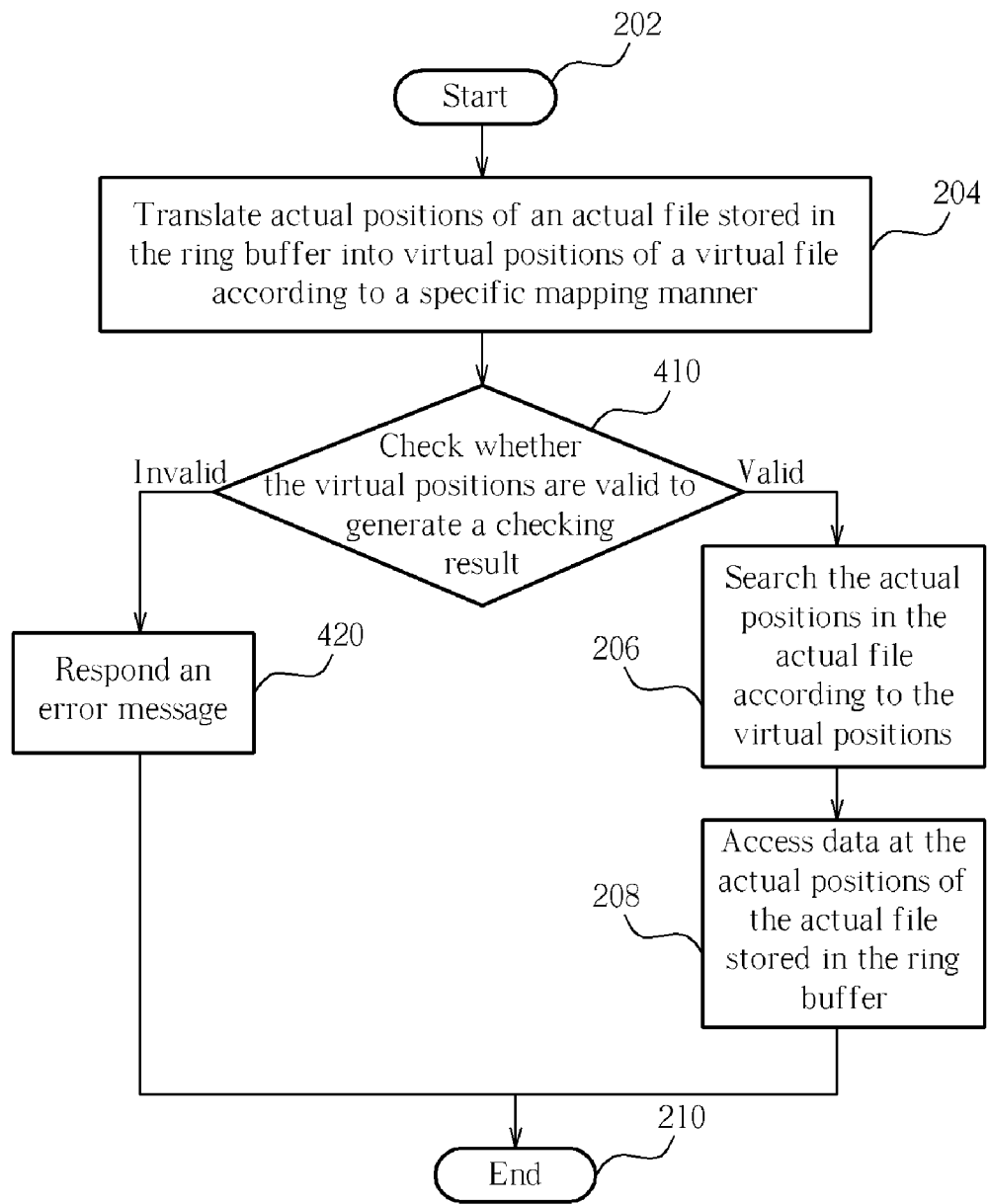
FIG. 4 is a flowchart illustrating a file management method of a ring buffer according to another exemplary embodiment of the present invention.

Of course, the abovementioned method is merely an exemplary embodiment of the present invention. In other embodiments, more functions are designated to provide the file management apparatus 300 with more operational options. Please refer to FIG. 4. FIG. 4 is a flowchart illustrating a file management method of a ring buffer according to another exemplary embodiment of the present invention. The exemplary method includes the following steps:

Step 202: Start.

Step 204: Translate actual positions of an actual file stored in the ring buffer into virtual positions of a virtual file according to a specific mapping manner.

Step 410: Check whether the virtual positions are valid to generate a checking result. If the checking result indicates that the virtual positions are valid, go to Step 206; otherwise, go to Step 420.

Step 206: Search the actual positions in the actual file according to the virtual positions.

Step 208: Access data at the actual positions of the actual file stored in the ring buffer.

Step 420: Respond an error message.

Step 210: End.

The steps shown in FIG. 4 are similar to that in FIG. 2. The difference between them is that FIG. 4 further adds a check function into the flow (i.e. the steps 410 and 420).

Figure 5:
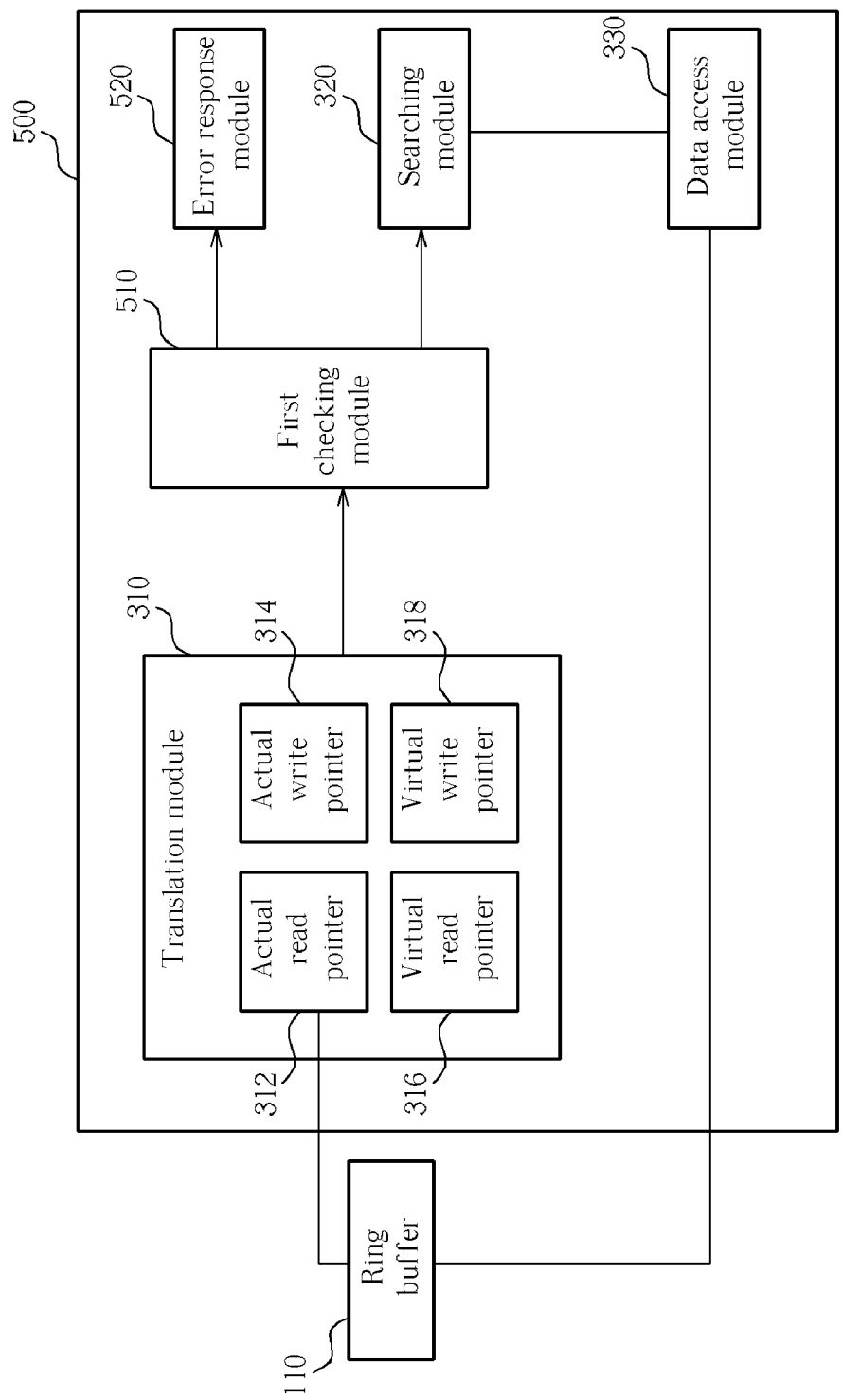
FIG. 5 is a block diagram of a file management apparatus according to another embodiment of the present invention.

Please refer to FIG. 5. FIG. 5 is a block diagram of a file management apparatus 500 according to another embodiment of the present invention. The file management apparatus 500 is similar to the file management apparatus 300 shown in FIG. 3. The difference between them is that the file management apparatus 500 further includes a first checking module 510 and an error response module 520. The first checking module 510 is coupled between the translation module 310 and the searching module 320 for checking whether the virtual positions are valid to thereby generate a checking result. The error response module 520 is coupled to the first checking module 510 for responding an error message when the checking result indicates that the virtual positions of the virtual file are invalid. In addition, the searching module 320 searches the actual positions in the actual file according to the virtual positions only when the checking result indicates that the virtual positions are valid.

Please refer to FIG. 5 together with FIG. 4 and FIG. 1. In the following description, how each element operates is described by collocating the steps shown in FIG. 4 and the elements shown in FIG. 5. In Step 204, actual positions of the actual file stored in the ring buffer 110 are translated into virtual positions of the virtual file by the translation module 310. That is, the actual write position A_write of the actual file 112 stored in the ring buffer 110 is translated into the virtual write position V_write of the virtual file 120, and the actual read position A_read of the actual file 114 stored in the ring buffer 110 is translated into the virtual read position V_read of the virtual file 120. If virtual positions are given, the first checking module 510 first checks whether the virtual positions are valid to thereby generate the checking result (Step 410). If the checking result indicates that the virtual positions are valid, the actual positions in the actual file are searched by the searching module 320 according to the virtual positions (Step 206). Thus, data at the actual positions of the actual file stored in the ring buffer 110 are accessed by the data access module 330 (Step 208). If the checking result indicates that the virtual positions are invalid, an error message is responded by the error response module 520 (Step 420).

Figure 6:
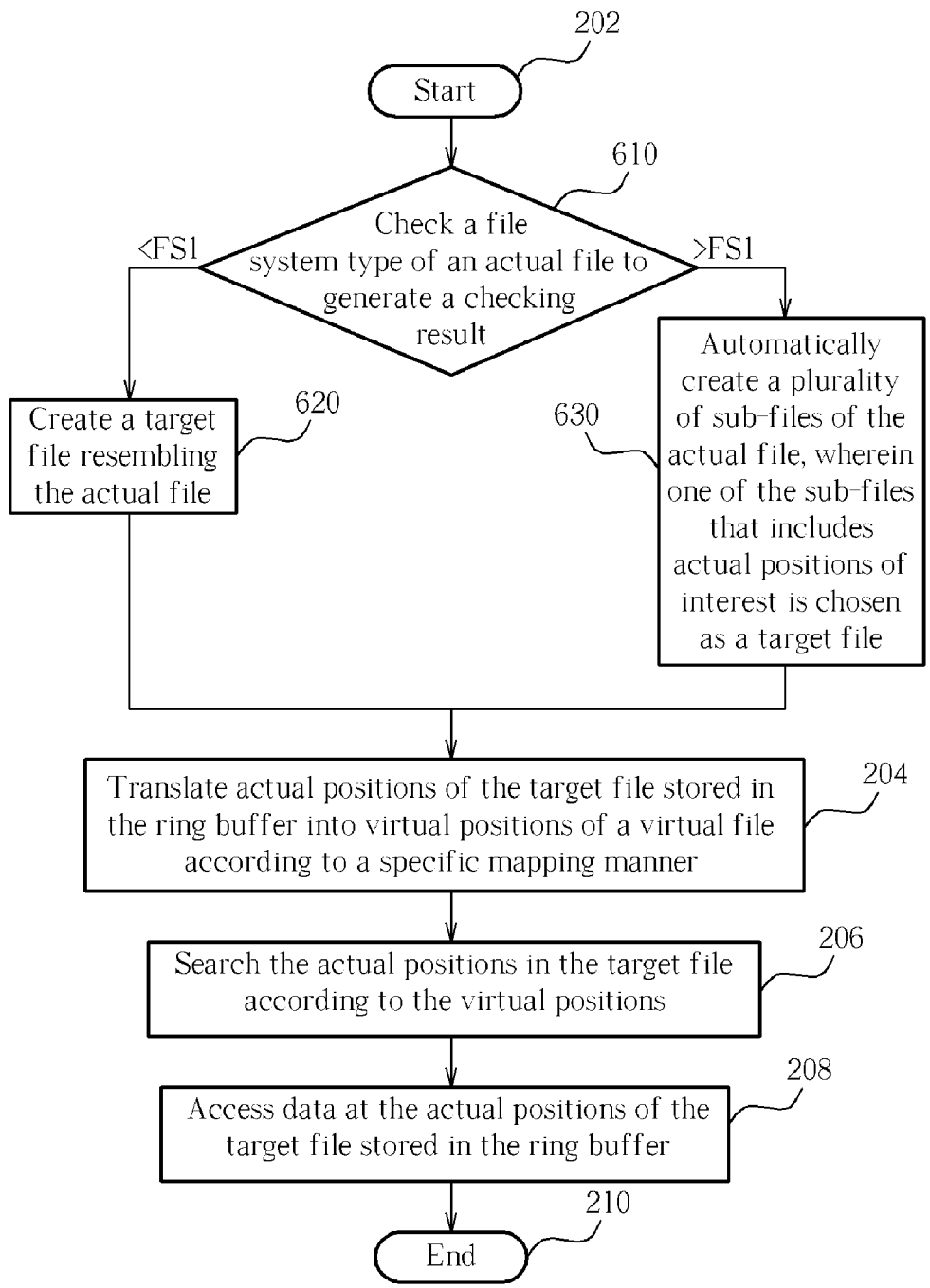
FIG. 6 is a flowchart illustrating a file management method of a ring buffer according to another exemplary embodiment of the present invention.

Please refer to FIG. 6. FIG. 6 is a flowchart illustrating a file management method of a ring buffer according to yet another exemplary embodiment of the present invention. The exemplary method includes the following steps:

Step 202: Start.

Step 610: Check a file system type of an actual file to generate a checking result. If the checking result indicates that a file size of the actual file exceeds a file size limit of the file system type, go to Step 630; otherwise, go to Step 620.

Step 620: Create a target file resembling the actual file.

Step 630: Automatically create a plurality of sub-files of the actual file, wherein one of the sub-files that includes actual positions of interest is chosen as a target file.

Step 204: Translate actual positions of the target file stored in the ring buffer into virtual positions of a virtual file according to a specific mapping manner.

Step 206: Search the actual positions in the target file according to the virtual positions.

Step 208: Access data at the actual positions of the target file stored in the ring buffer.

Step 210: End.

FIG. 6 further includes a file system type check function (i.e. the steps 610, 620 and 630).

Figure 7:
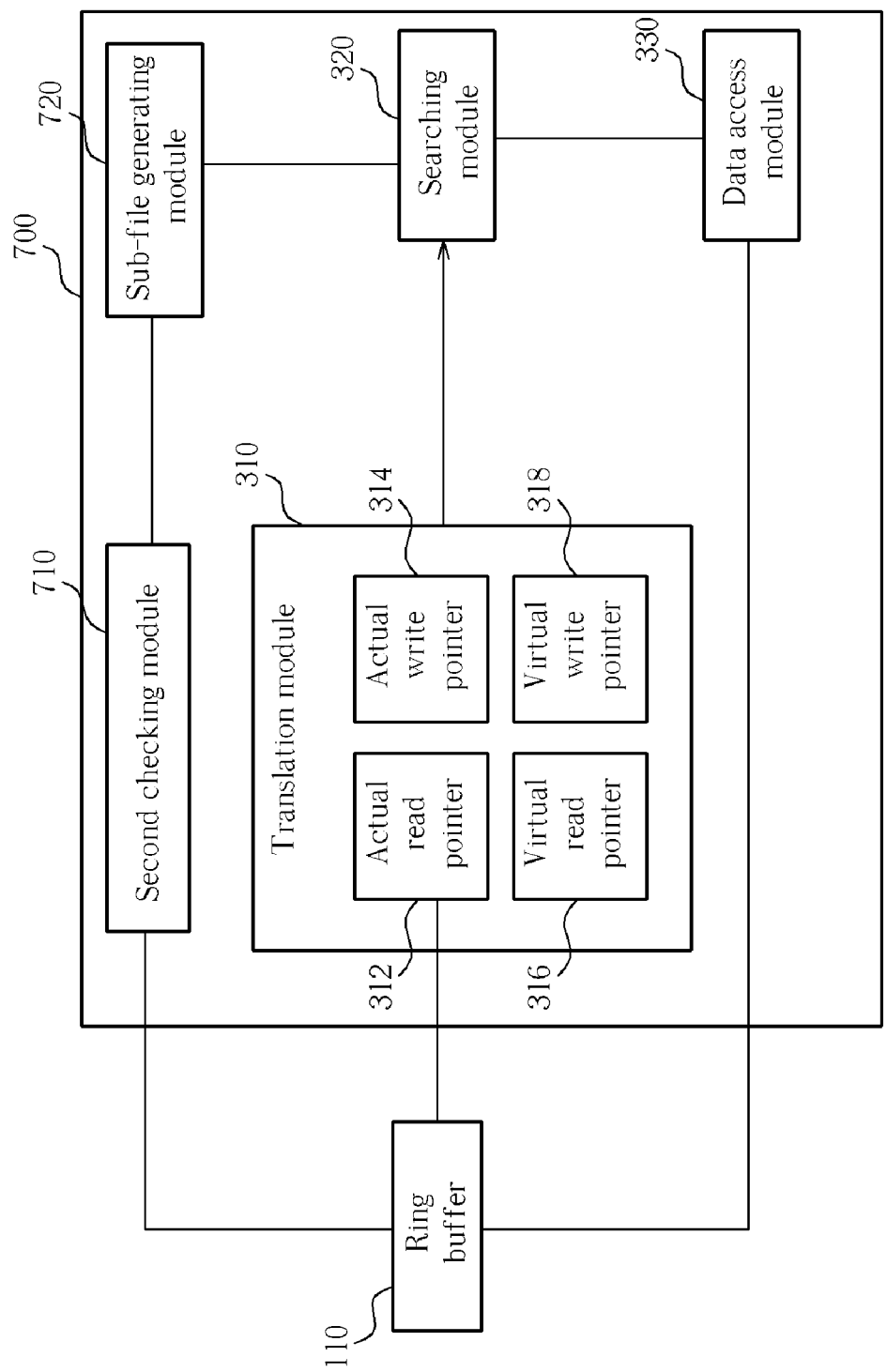
FIG. 7 is a block diagram of a file management apparatus according to another embodiment of the present invention.

Please refer to FIG. 7. FIG. 7 is a block diagram of a file management apparatus 700 illustrated according to yet another embodiment of the present invention. The file management apparatus 700 is similar to the file management apparatus 300 shown in FIG. 3. The difference between them is that the file management apparatus 700 further includes a first checking module 710 and a sub-file generating module 720. The second checking module 710 is coupled to the ring buffer 110 and the translation module 310 for checking the file system type of the actual file to generate a checking result. The sub-file generating module 720 is coupled to the second checking module 710 and the searching module 320 for automatically creating a plurality of sub-files of the actual file when the checking result indicates that a file size of the actual file exceeds a file size limit of the file system type. Assume that the file system type of the actual file is FAT32, which has an upper size limit of 4 GB. If the actual file has a file size exceeds 4 GB (such as 20 GB), the actual file is divided into five sub-files by the sub-file generating module 720 automatically, i.e., no user intervention is required. One of the sub-files including actual positions of interest is chosen as a target file. On the other hand, if the file size of the actual file doesn't exceed 4 GB (such as 2.5 GB), only one actual file, which is the target file will be generated.

Please refer to FIG. 7 together with FIG. 6 and FIG. 1. In the following description, how each element operates is described by collocating the steps shown in FIG. 6 and the elements shown in FIG. 7. In Step 610, a file system type of the actual file is checked by the second checking module 710 to generate a checking result. If the file size of the actual file doesn't exceed the file size limit of the file system type, only the actual file is created (Step 620). If the file size of the actual file exceeds a file size limit of the file system type, a plurality of sub-files of the actual file is automatically created by the sub-file generating module 720 and a target file is chosen (Step 630). In the steps 204-210, the operations are all the same as the steps 204-210 in FIG. 2, and further description is omitted here for brevity.

These embodiments above are presented merely for describing applications of the present invention, and in no way should be considered to be limitations of the scope of the present invention. It will be obvious to those skilled in the art that various modifications of the file management apparatus may be made without departing from the spirit of the present invention.

Provided that substantially the same result is achieved, the steps of the method shown in FIG. 2, FIG. 4, and FIG. 6 need not be in the exact order shown and need not be contiguous, that is, other steps can be intermediate.

The abovementioned embodiments are presented merely for describing the present invention, and in no way should be considered to be limitations of the scope of the present invention. The abovementioned ring buffer 110 can be a hard disk, but is not limited to this only and can be storage devices of other types. Furthermore, the ring buffer 110 is used for storing a media stream, which includes data such as an audio-video stream transmitted from network or TV broadcasting signals, etc., but those skilled in the art should know that this is not a limitation of the present invention. Please note that, the file management method and the file management apparatus disclosed in the present invention are employed in a live media time-shift application. Of course, the abovementioned method is merely an exemplary embodiment of the present invention. In other embodiments, more functions are designated into the flow chart to provide the file management apparatus with more choices. For example, a check function can be added into the file management method and the file management apparatus of the present invention. Those skilled in the art should observe that various modifications of the file management apparatus may be made. Furthermore, the steps of the method shown in FIG. 2, FIG. 4, and FIG. 6 need not be in the exact order shown and need not be contiguous, and can include other intermediate steps.

In summary, the present invention provides a file management method and related file management apparatus of a ring buffer. Through the translation layer 130 shown in FIG. 1, which is implemented by the translation module 310 shown in FIG. 3, storages with limited sizes can be viewed as infinite to meet hardware requirements. Therefore, the cost of the local storage can be saved. Furthermore, the virtual file 120 is suitable for traditional recording and playback applications, which also meets software requirements. The time-shift applications under any file system can be realized with limited storage capacity.

Those skilled in the art will readily observe that numerous modifications and alterations of the device and method may be made while retaining the teachings of the invention.

What is claimed is:

1. A file management method of a ring buffer, comprising:
translating actual positions of an actual file stored in the ring buffer into virtual positions of a virtual file according to a specific mapping manner;
searching the actual positions in the actual file according to the virtual positions;
accessing data at the actual positions of the actual file stored in the ring buffer;
checking a file system type of the actual file to generate a checking result; and
automatically creating a plurality of sub-files of the actual file when the checking result indicates that a file size of the actual file exceeds a file size limit of the file system type, wherein one of the sub-files comprising the actual positions is chosen as a target file and transferred to the ring buffer.

2. The file management method of claim 1, wherein a file size of the virtual file is not limited by the file size limit of the file system type.

3. The file management method of claim 1, wherein:
the actual positions comprise an actual read position and an actual write position; and
the virtual positions comprise a virtual read position mapped to the actual read position and a virtual write position mapped to the actual write position.

4. The file management method of claim 1 further comprising:
checking whether the virtual positions are valid to generate a checking result;
wherein searching the actual positions in the actual file according to the virtual positions is performed when the checking result indicates that the virtual positions are valid.

5. The file management method of claim 4 further comprising:
when the checking result indicates that the virtual positions of the virtual file are invalid, responding an error message.

6. The file management method of claim 1, wherein the method is employed in a live media time-shift application.

7. The file management method of claim 1, wherein the actual file contains contents of a media stream that have been received and are saved in local storage, the file size of the actual file exceeding a fixed size of the ring buffer.

8. A file management apparatus of a ring buffer, comprising:
a processor;
a translation module, for translating actual positions of an actual file stored in the ring buffer into virtual positions of a virtual file according to a specific mapping manner;
a searching module, coupled to the translation module, for searching the actual positions in the actual file stored in the ring buffer according to the virtual positions;
a data access module, coupled to the ring buffer and the searching module, for accessing data at the actual positions of the actual file stored in the ring buffer;
a second checking module, for checking a file system type of the actual file to generate a checking result; and
a sub-file generating module, coupled to the second checking module, for automatically creating a plurality of sub-files of the actual file when the checking result indicates that a file size of the actual file exceeds a file size limit of the file system type, wherein one of the sub-files comprising the actual positions is chosen as a target file and transferred to the ring buffer.

9. The file management apparatus of claim 8, wherein a file size of the virtual file is not limited by the file size limit of the file system type.

10. The file management apparatus of claim 8, wherein the translation module comprises:
an actual read pointer, for pointing to an actual read position;
an actual write pointer, for pointing to an actual write position;
a virtual read pointer, for pointing to a virtual read position mapped to the actual read position; and
a virtual write pointer, for pointing to a virtual write position mapped to the actual write position.

11. The file management apparatus of claim 8 further comprising:
a first checking module, coupled between the translation module and the searching module, for determining whether the virtual positions are valid to generate a checking result;
wherein the searching module searches the actual positions in the actual file according to the virtual positions only when the determining operation indicates that the virtual positions are valid.

12. The file management apparatus of claim 11 further comprising:
an error response module, coupled to the first checking module, for responding an error message when the determining operation indicates that the virtual positions of the virtual file are invalid.

13. The file management apparatus of claim 8, wherein the file management apparatus is employed in a live media time-shift application.

14. The file management apparatus of claim 8, wherein the actual file contains contents of a media stream that have been received and are saved in local storage, the file size of the actual file exceeding a fixed size of the ring buffer.

* * * * *